(12) United States Patent
Suzuki et al.

(10) Patent No.: US 8,925,792 B1
(45) Date of Patent: Jan. 6, 2015

(54) JOINING PROCESS FOR SUPERALLOYS (71) Applicant: General Electric Company, Schenectady, NY (US)

(72) Inventors: Akane Suzuki, Clifton Park, NY (US); Jeffrey Jon Schoonover, Albany, NY (US); David Austin Wark, West Sand Lake, NY (US)

(73) Assignee: General Electric Company, Niskayuna, NY (US)

( * ) Notice: Subject to any disclaimer, the term of this patent is extended or adjusted under 35 U.S.C. 154(b) by 78 days.

(21) Appl. No.: 13/918,004

(22) Filed: Jun. 14, 2013

(51) Int. Cl.
*B23K 31/02* (2006.01)
*B23K 20/22* (2006.01)

(52) U.S. Cl.
CPC ..................................... *B23K 20/22* (2013.01)
USPC ...... 228/227; 228/233.2; 228/245; 228/262.3

(58) Field of Classification Search
None
See application file for complete search history.

(56) References Cited

U.S. PATENT DOCUMENTS

| | | | | |
|---|---|---|---|---|
| 3,678,570 | A | | 7/1972 | Paulonis et al. |
| 3,871,928 | A | * | 3/1975 | Smith et al. .................. 148/607 |
| 4,033,792 | A | | 7/1977 | Giamei et al. |
| 4,402,772 | A | | 9/1983 | Duhl et al. |
| 4,507,264 | A | * | 3/1985 | Stern ............................. 420/443 |
| 4,900,394 | A | * | 2/1990 | Mankins ......................... 117/10 |
| 5,154,884 | A | | 10/1992 | Wukusick et al. |
| 5,482,578 | A | * | 1/1996 | Rose et al. .................... 148/516 |
| 5,549,767 | A | * | 8/1996 | Pietruska et al. ............. 148/512 |
| 5,891,272 | A | | 4/1999 | Raymond et al. |
| 6,325,871 | B1 | | 12/2001 | Burke et al. |
| 6,982,123 | B2 | * | 1/2006 | Budinger et al. ............. 428/680 |
| 7,166,176 | B2 | | 1/2007 | Gell et al. |
| 7,533,795 | B2 | * | 5/2009 | Schaeffer et al. ............. 228/226 |
| 7,763,129 | B2 | | 7/2010 | Mourer et al. |
| 8,083,124 | B1 | | 12/2011 | Darolia et al. |
| 8,083,872 | B2 | | 12/2011 | Mitchell et al. |
| 2003/0102061 | A1 | * | 6/2003 | Spiegel et al. ................ 148/527 |
| 2006/0071056 | A1 | * | 4/2006 | Das ............................... 228/245 |
| 2009/0285715 | A1 | * | 11/2009 | Arjakine et al. .............. 420/450 |
| 2014/0161618 | A1 | * | 6/2014 | Walker et al. .............. 416/223 A |

OTHER PUBLICATIONS

Kim et al., "Bonding Phenomena of Transient Liquid Phase Bonded Joints of a Ni base Single Crystal Superalloy", Metals and Materials International, pp. 403-410, vol. 8, Issue 4, 2002.
Li et al., "Study of Ni—Cr—Co—W—Mo—B interlayer Alloy and its Bonding Behaviour for a Ni-base Single Crystal Superalloy", Scripta Materialia, Elsevier, pp. 1283-1288, vol. 48, Issue 9, Feb. 26, 2003.
Zhang et al., "Simulation of Single Crystal Nickel-Based Superalloys Creep on Finite Element Method", Advanced Materials Research, pp. 2029-2033, vol. 433-440, Jan. 3, 2012.
Cook et al., "Overview of transient liquid phase and partial transient liquid phase bonding", J. Mater. Sci., pp. 5305-5323, 5307, vol. 46, 2011.

* cited by examiner

Primary Examiner — Kiley Stoner
(74) Attorney, Agent, or Firm — Paul J. DiConza (57) ABSTRACT

A method of bonding superalloys is provided. The method includes: aligning a first superalloy subcomponent having a gamma-prime solvus $g'_1$ and a second superalloy subcomponent having a gamma-prime solvus $g'_2$, with a filler material that includes at least 1.5 wt % boron disposed between the first and second superalloy subcomponents; performing a first heat treatment at a temperature $T_1$, where $T_1$ is above the solidus of the filler material and below the liquidus of the filler material; and performing a second heat treatment at a temperature $T_2$, where $T_2$ is greater than $T_1$, and where $T_2$ is greater than or equal to the lower of $g'_1$ and $g'_2$.

20 Claims, 5 Drawing Sheets

Prior Art

FIG. 8

JOINING PROCESS FOR SUPERALLOYS

BACKGROUND

The invention includes embodiments that relate to a method of bonding superalloys. More particularly, the invention relates to a semi-solid method of bonding superalloys.

Superalloy components are commonly used in various applications, including, for example, in aircraft engine, gas turbine, and marine turbine industries. Generally, the quality of the superalloy components is imperative to their successful function. To achieve the requisite quality products, even very large superalloy components (e.g., first stage buckets of gas turbines) are often cast so as to avoid joining (bonding) components wherever possible. However, such large superalloy components typically suffer from low casting yield due to the size, complex shape, and/or presence of core. Even for smaller components, casting a single component can be less than ideal due to, for example, complex shapes required of the component.

Segmenting superalloy components into smaller multiple subcomponents enables reducing the size of subcomponents, simplifying the shape, and/or eliminating the core, thereby allowing for improved casting yield. However, thus far, prior art focusing on joining processes, including welding and brazing, has failed to produce mechanically sound joints. When superalloy components are joined, the joint typically possesses inferior mechanical properties (lower tensile strength, shorter creep and fatigue life, lower ductility) due to discontinuity of chemistry and/or microstructure across the joint. The same drawbacks have impacted the ability to obtain hybrid components comprising different alloys, and have plagued the art of repair processes, which seek to replace damaged portion(s) of superalloy components.

Thus, a need exists for an improved method of bonding superalloys that allows for joining subcomponents, preferably in higher-yield processes while maintaining high quality mechanical properties.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION

Briefly, the present invention satisfies the need for an improved method of bonding superalloys.

More particularly, provided is a method of bonding superalloys, which includes: aligning a first superalloy subcomponent having a gamma-prime solvus $g'_1$ and a second superalloy subcomponent having a gamma-prime solvus $g'_2$, with a filler material comprising at least 1.5 wt % boron disposed therebetween; performing a first heat treatment at a temperature $T_1$, wherein $T_1$ is above the solidus of the filler material and below the liquidus of the filler material; and performing a second heat treatment at a temperature $T_2$, wherein $T_2$ is greater than $T_1$, and wherein $T_2$ is greater than or equal to the lower of $g'_1$ and $g'_2$.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed methods for bonding superalloys have several features, no single one of which is solely responsible for their desirable attributes. Without limiting the scope of these methods as defined by the claims that follow, their more prominent features will now be discussed briefly. After considering this discussion, and particularly after reading the section of this specification entitled "Detailed Description" one will understand how the features of the various embodiments disclosed herein provide a number of advantages over the current state of the art. These advantages may include, without limitation, providing methods which allow for: joining of subcomponents, creating sound joints that are substantially free of grain boundaries, improving casting yield of superalloy components, obtaining joints and joined superalloys having high quality mechanical properties, providing improved repair processes, and/or providing improved processes allowing for the design and manufacturing of hybrid components (which can be beneficial, for example, where components comprising dissimilar subcomponent alloys are desired, e.g., aircraft engine blades and gas turbine buckets tend to see higher temperature along the leading and trailing edges, which causes faster creep damage accumulation compared with the remainder portion of the airfoil—hybrid joining would allow for attaching a stronger alloy along the leading and trailing edges, and can offer economical advantages).

These and other features and advantages of this invention will become apparent from the following detailed description of the various aspects of the invention taken in conjunction with the appended claims and the accompanying drawings.

DETAILED DESCRIPTION

The present invention is generally directed to methods of bonding superalloys.

Although this invention is susceptible to embodiment in many different forms, certain embodiments of the invention are shown and described. It should be understood, however, that the present disclosure is to be considered as an exemplification of the principles of this invention and is not intended to limit the invention to the embodiments illustrated.

In one aspect, the invention relates to a method of bonding superalloys. The method comprises: aligning a first superalloy subcomponent having a gamma-prime solvus $g'_1$ and a second superalloy subcomponent having a gamma-prime solvus $g'_2$, with a filler material comprising at least 1.5 wt % boron disposed therebetween; performing a first heat treatment at a temperature $T_1$, wherein $T_1$ is above the solidus of the filler material and below the liquidus of the filler material; and performing a second heat treatment at a temperature $T_2$, wherein $T_2$ is greater than $T_1$, and wherein $T_2$ is greater than or equal to the lower of $g'_1$ and $g'_2$.

Where reference is made herein to "aligning" superalloy subcomponents (e.g., aligning a first superalloy subcomponent having a gamma-prime solvus g'1 and a second superalloy subcomponent having a gamma-prime solvus g'2, with a filler material disposed therebetween), "aligning" is intended to include arranging the superalloy subcomponents relative to one another in any manner conducive to the joining method described herein.

While reference is made herein to a first and second superalloy, persons having ordinary skill in the art will readily recognize that the inventive method may be used to join two or more (e.g., three, four, etc.) superalloy subcomponents.

The first and second superalloy subcomponents may be of any desirable superalloy subcomponent composition.

In some embodiments, the first superalloy subcomponent is the same material as the second superalloy subcomponent. In some embodiments, the first and second superalloy subcomponents comprise different materials.

In some embodiments, the first and second superalloy subcomponents independently comprise a material selected from a single crystal superalloy, a directionally solidified superalloy, and a polycrystalline superalloy.

As used herein, a "single crystal superalloy" includes an alloy formed as a single crystal, such that there are generally no high angle grain boundaries in the material.

As used herein, a "directionally solidified superalloy" includes an alloy having a columnar grain structure where grain boundaries created in the solidification process are aligned parallel to the growth direction.

As used herein, a "polycrystalline superalloy" includes an alloy having a randomly oriented equiaxed grain structure.

In some embodiments, the first superalloy subcomponent and the second superalloy subcomponent are selected such that:
the first superalloy subcomponent comprises a single crystal superalloy and the second superalloy subcomponent comprises a single crystal superalloy;
the first superalloy subcomponent comprises a single crystal superalloy and the second superalloy subcomponent comprises a directionally solidified superalloy;
the first superalloy subcomponent comprises a directionally solidified superalloy and the second superalloy subcomponent comprises a directionally solidified superalloy;
the first superalloy subcomponent comprises a single crystal superalloy and the second superalloy subcomponent comprises a polycrystalline superalloy;
the first superalloy subcomponent comprises a directionally solidified superalloy and the second superalloy subcomponent comprises a polycrystalline superalloy; or
the first superalloy subcomponent comprises a polycrystalline superalloy and the second superalloy subcomponent comprises a polycrystalline superalloy.

In some embodiments, at least one of the first superalloy subcomponent and the second superalloy subcomponent is a single crystal superalloy subcomponent.

In some embodiments, at least one of the first superalloy subcomponent and the second superalloy subcomponent comprises a nickel-based superalloy. In some embodiments, both the first superalloy subcomponent and the second superalloy subcomponent comprise a nickel-based superalloy.

In some embodiments, one or both of the first superalloy subcomponent and the second superalloy subcomponent comprises at least 50 wt % nickel. For example, in some embodiments, one or both of the first superalloy subcomponent and the second superalloy subcomponent comprises 50, 51, 52, 53, 54, 55, 56, 57, 58, 59, 60, 61, 62, 63, 64, 65, 66, 67, 68, 69, or 70 wt % nickel, including any and all ranges and subranges therein.

In some embodiments, one or both of the first superalloy subcomponent and the second superalloy subcomponent comprises nickel, cobalt, chromium, molybdenum, tungsten, aluminum, and/or tantalum. In certain embodiments, one or both of the first superalloy subcomponent and the second superalloy subcomponent may additionally comprise rhenium, hafnium, titanium, niobium, ruthenium, carbon, and/or boron.

According to the inventive method, the first superalloy subcomponent has a gamma-prime ($\gamma'$) solvus $g'_1$, and the second superalloy subcomponent has a gamma-prime solvus $g'_2$. Above the gamma prime solvus temperature of an alloy, the gamma prime phase is taken completely into solution in the gamma matrix after holding for sufficient diffusion or at equilibrium condition.

Persons having ordinary skill in the art will recognize that the gamma prime solvus temperature is a function of actual composition. For example, typical gamma prime solvus temperatures for nickel-based superalloys are 1120° C. to 1190° C. The Rene N5 nickel-based single crystal alloy has a reported gamma prime solvus of about 1269° C.

The filler material used in methods of the invention may be, for example, in the form of a coating, paste or foil (produced by, for example, melt-spinning, rolling). The filler material is disposed between the first superalloy subcomponent and the second superalloy subcomponent in any desirable manner. For example, where the filler material is a coating, it may be spray-coated or otherwise applied (e.g., by painting, ion-plasma deposition, etc.) onto one or both of the first and second superalloy subcomponents. Where the filler material is a paste, foil or other form, it may also be disposed between the first and second superalloy subcomponents in any desirable manner.

The filler material comprises at least 1.5 wt % boron, which functions to depress the melting point of the filler material. In some embodiments, the filler material comprises 1.5 to 4 wt % boron. For example, in such embodiments, the filler material may comprise 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 wt % boron, including any and all ranges and subranges therein (e.g., 1.5 to 4.2 wt %, 2 to 4 wt %, etc.)

Apart from the at least 1.5 wt % boron, the remaining composition of the filler material may be selected depending upon the desired component to be formed, and the subcomponents to be joined. Examples of component elements which may be included in the filler material include, without exception, Ni, Co, Cr, Mo, W, Al, Ta, and Hf.

In some embodiments, the filler material is nickel-based.

In some embodiments, the filler material is selected such that its composition is similar to that of one or more superalloy subcomponents to be joined.

In some embodiments, the filler material is applied to one or both of the first and second superalloy subcomponents before the subcomponents are assembled (i.e., aligned with one another, having the filler material disposed therebetween).

The filler material may be of any desired thickness that is consistent with the intent and purpose of the inventive method. For example, in some embodiments, the filler material has a thickness of 5 to 100 μm, e.g., 5, 10, 15, 20, 25, 30, 35, 40, 45, 50, 55, 60, 65, 70, 75, 80, 85, 90, 95, or 100 μm thick, including any and all ranges and subranges therein (e.g., 10 to 50 μm thick).

A heat treatment process can be described by a curve of temperature vs. time. In the process of the invention, $T_1$ represents an inflection point on the curve of temperature vs. time (i.e., the curve is not continuous). This is to be distinguished from a process in which the substrate is heated steadily to a temperature $T_n$ (where $T_n$ is greater than $T_1$), in which case the curve would show no inflection point at T1. The purpose of the "first heat treatment at a temperature $T_1$" is to partially melt the filler material, and to cause boron to diffuse out from the filler material. Thus the heat treatment is maintained at $T_1$ for a period of time sufficient to partially melt the filler material, and to cause boron to diffuse out from the filler material.

Applicants have unexpectedly found that using such a temperature $T_1$ in the joining process of the invention results in a markedly improved process over prior art joining methods, such as prior art transient liquid phase bonding processes (disclosed, for example, in U.S. Pat. No. 6,325,871).

As the name implies, transient liquid phase bonding (TLPB) is a bonding process that joins materials using an interlayer, which is completely melted during heat treatment at a bonding temperature which exceeds the liquidus of the interlayer. In fact, "[t]he bonding temperature is usually well above the interlayer's melting point to ensure complete melting of the interlayer and to increase the rate of diffusion." Cook et al., "Overview of transient liquid phase and partial transient liquid phase bonding", J. Mater. Sci., (2011) 46:5305-5323, 5307.

While TLPB prior art requires a heat treatment corresponding to the first heat treatment of the present invention at a temperature exceeding the liquidus of the filler material, the present inventive method employs a first heat treatment at a temperature $T_1$, wherein $T_1$ is above the solidus of the filler material and below the liquidus of the filler material, such that, in the inventive method, the filler material does not fully melt as it does in TLPB processes. Applicants have unexpectedly found that the present method, employing a first heat treatment at a temperature $T_1$, yields an improved joined superalloy structure.

During the first heat treatment, a joint is created between the first and second superalloy subcomponents by partially melting the filler material. Boron diffuses out from the filler material into the first and second subcomponents, and small grains are left along the joint. In some embodiments, grain size is smaller than 100 μm, more preferably, smaller than 50 μm. For example, in certain embodiments, grain size may be, e.g., 95, 90, 85, 80, 75, 70, 65, 60, 55, 50, 45, 40, 35, 30, 25, 20, 15, or 10 μm, including any and all ranges and subranges therein.

In some embodiments, the first heat treatment is performed at a temperature $T_1$ at least 10° C. above the solidus of the filler material. For example, in some embodiments, $T_1$ is performed at a temperature that is 10, 15, 20, 25, 30, 35, 40, 45, 50, 55, 60, 65, 70, 75, 80, 85, 90, 95, 100, 105, 110, 120, 130, 140, or 150° C. above the solidus of the filler material, including any and all ranges and subranges therein (e.g., 15-100° C., 20-80° C., 20-50° C., etc.), provided that $T_1$ is below the liquidus of the filler material. In some embodiments, the first heat treatment is performed at a temperature $T_1$ at least 20° C. above the solidus of the filler material.

While the temperature $T_1$ of the first heat treatment may be any desired temperature that is greater than the solidus of the filler material and less than the liquidus of the filler material, in some embodiments, the first heat treatment is performed at a temperature $T_1$ equal to about 1,000 to 1,200° C. For example, in some embodiments, the temperature $T_1$ is 1,000, 1,025, 1,050, 1,075, 1,100, 1,125, 1,150, 1,175, or 1,200° C., including any and all ranges and subranges therein (e.g., 1,100 to 1,200° C.).

The duration of the first heat treatment should be sufficient to partially melt the filler material, and to cause boron to diffuse out from the filler material. For example, in some embodiments, during the first heat treatment, the temperature is held at $T_1$ for at least 15 minutes. In other embodiments, the temperature is held at $T_1$ for at least 30 minutes, or for at least one hour, and less than 10 hours.

In some embodiments, during the first heat treatment, the temperature is held at $T_1$ for at least one hour, and wherein, during the second heat treatment, the temperature is held at T2 for at least one hour.

In some embodiments, pressure is applied to the first and second superalloy subcomponents during the first heat treatment. For example, in some embodiments, pressure is applied to the assembled first and second superalloy subcomponents in the direction of the joint (i.e., from outer portions of the subcomponents toward the filler material disposed between the subcomponents). In some embodiments, during the first heat treatment, 0.2 to 4 MPa pressure is applied to the first and second superalloy subcomponents. For example, in some embodiments, 0.2, 0.4, 0.6, 0.8, 1.0, 1.2, 1.4, 1.6, 1.8, 2.0, 2.2, 2.4, 2.6, 2.8, 3.0, 3.2, 3.4, 3.6, 3.8, or 4.0 MPa pressure is applied to the first and second superalloy subcomponents, including any and all ranges and subranges therein (e.g., 0.5 to 2 MPa). In some embodiments, pressure is also applied during the second heat treatment. In other embodiments, pressure is not applied during the second heat treatment.

In some embodiments, a fixture is used to assemble the first and second superalloy subcomponents during the first heat treatment. In some embodiments, the fixture is not used during the second heat treatment, while in other embodiments, the semi-bonded alloys (i.e., the subcomponents following the first heat treatment) remain in a fixture during the second heat treatment.

The second heat treatment is performed subsequent to the first heat treatment. More specifically, the second heat treatment is performed at a temperature $T_2$, wherein $T_2$ is greater than $T_1$, and wherein $T_2$ is greater than or equal to the lower of $g'_1$ and $g'_2$.

In some embodiments, $T_2$ is greater than or equal to the higher of $g'_1$ and $g'_2$. However, $T_2$ should not exceed the solidus temperature of the first or second superalloy subcomponents.

While $T_2$ may be any temperature that is greater than $T_1$, and greater than or equal to the lower of $g'_1$ and $g'_2$, in some embodiments, the second heat treatment is performed at a temperature $T_2$ of 1,200 to 1,350° C. For example, in some embodiments, $T_2$ is 1,200, 1,225, 1,250, 1,275, 1,300, 1,325, or 1,350° C., including any and all ranges and subranges therein (e.g., 1,225 to 1,325° C.).

In some embodiments, during the second heat treatment, the temperature is held at $T_2$ for at least 15 minutes, or at least 30 minutes, or at least 45 minutes, or at least one hour, or at least 2, 3, 4, 5, 6, 7, 8, 9, 10, 11, 12, 13, 14, 15, 16, 17, 18, 19, 20, 21, 22, 23, 24, 25, 26, 27, 28, 29 or 30 hours.

In some embodiments, the second heat treatment is a standalone treatment, insofar as the treatment at $T_2$ may be unaccompanied by any other immediate temporally proximate heat treatment steps (thus, e.g., $T_2$ is not a step in a ramped heat treatment schedule). However, in some embodiments, the second heat treatment may represent one step out of a multi-step heat treatment, which may include, for example, ramped heat treatment (e.g., ramped solution heat treatment) comprising heat treatments at other temperatures as well.

In some embodiments (e.g., when subcomponents are single-crystal alloys), the first superalloy subcomponent and the second superalloy subcomponent have less than a 10° crystal orientation deviation from each other. For example, in certain embodiments, the first superalloy subcomponent and the second superalloy subcomponent have less than a 9°, 8°, 7°, 6°, 5°, 4°, 3°, 2°, 1° or 0° crystal orientation deviation from each other.

In various embodiments, the inventive methods include any other desirable steps for joining superalloy subcomponents. These steps may include for example, solution heat treatment and/or precipitation aging treatments of the first and/or second superalloy subcomponents.

The methods of the invention allow for the chemistry and microstructure of the first and second superalloy subcomponents to be substantially reproduced within the joint.

Several embodiments of the invention are described in the examples below.

EXAMPLES

Example A

Two Rene N5 nickel-based single crystal superalloy subcomponents (composition shown in Table I) were prepared by finishing with low stress grinding, such that the subcomponents had less than 10° crystal orientation deviation from each other, had substantially flat mating surfaces, and were smooth and clean. The Rene N5 subcomponents were aligned with a ~2 mil thick N5-2B foil (see Table I), which comprised 2 wt % boron, as filler material in a fixture, and pressure was applied at about 1 MPa. In vacuum environment, the aligned subcomponents were subjected to a first heat treatment while in the fixture at 1150° C. for one hour, then the subcomponents were allowed to cool to room temperature. During the first heat treatment, the filler partially melted, and the subcomponents were metallurgically joined. Following heating, the joint area was made up of fine grains.

Figure 1:
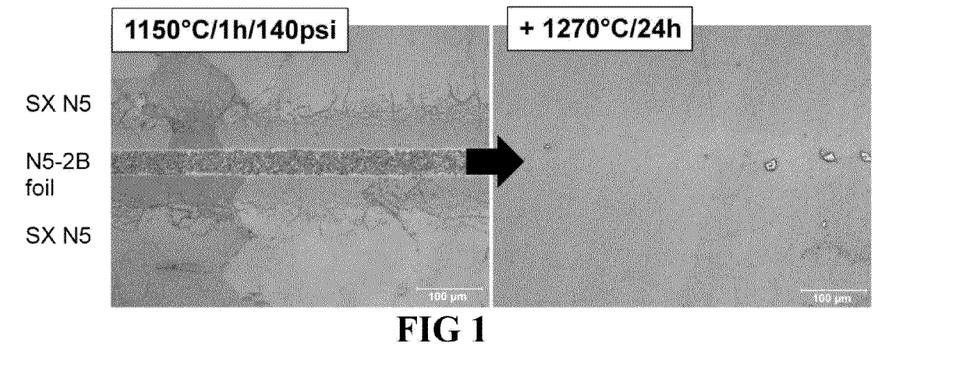
FIG. 1 is a photo micrograph showing the microstructure change at the joint following a bonding process according to an embodiment of the invention.
Figure 2:
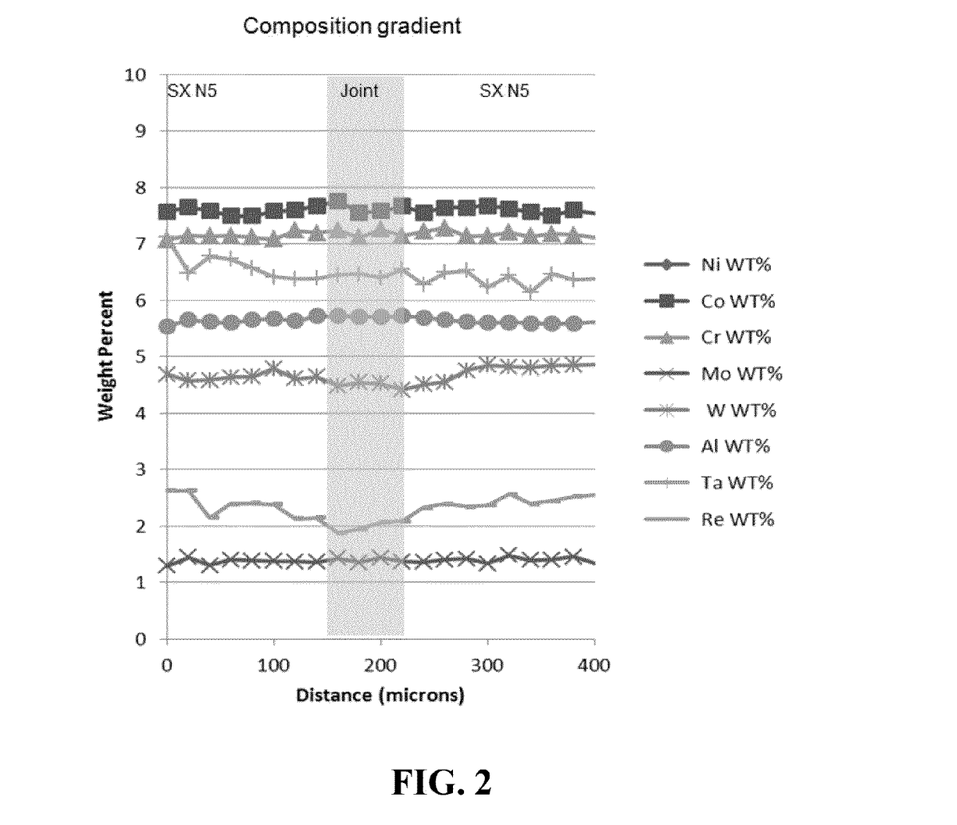
FIG. 2 is a chart showing the composition gradient of joined superalloy subcomponents following bonding according to an embodiment of the invention.

The cooled joined components were removed from the fixture, and, in the absence of pressure, were subjected to a second heat treatment in an inert environment at 1270° C. for 24 hours. During this second heat treatment step, the fine grains along the joint diminished in size and eventually disappeared by grain coarsening of the single crystal grain of the subcomponents. The chemical gradient along the joint also diminished. FIG. 1 is a photo micrograph showing the microstructure change at the joint following the first and second heat treatments, where the subcomponents are represented as "SX N5". FIG. 2 is a chart showing the composition gradient of the joined superalloy subcomponents following the second heat treatment. As shown, consistent element levels were observed across the subcomponents and joint, with the exception of a slight drop in Re at the joint.

TABLE I

| (wt %) | Ni | Co | Cr | Mo | W | Re | Al | Ta | Hf | C | B | Solidus | Liquidus |
|---|---|---|---|---|---|---|---|---|---|---|---|---|---|
| Rene N5 | bal. | 7.5 | 7 | 1.5 | 5 | 3 | 6.2 | 6.5 | 0.15 | 0.05 | 0.004 | 1344 C | 1397 C |
| N5-2B | bal. | 7.5 | 7 | 1.5 | 5 |  | 6.2 | 6.5 | 0.15 |  | 2 | 1110 C | 1260 C |
| MDC115 | bal. | 8 | 9 |  | 4 |  | 2 | 4 | 1 |  | 3 | 1035 C* | 1190 C* |

* = calculated

Example B

Figure 3:
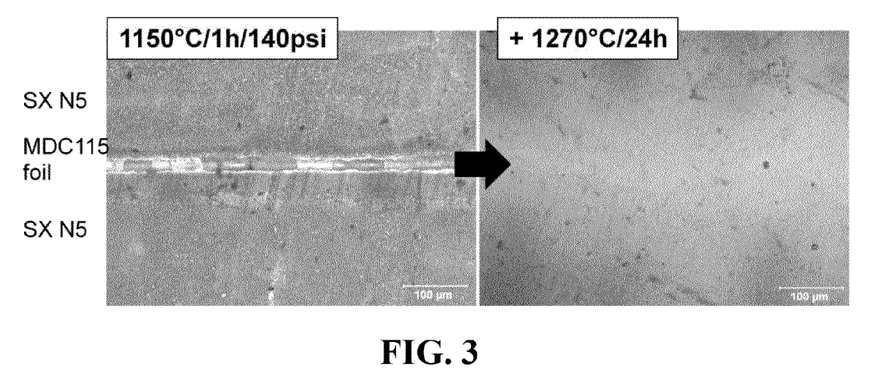
FIG. 3 is a photo micrograph showing the microstructure change at the joint following bonding according to another embodiment of the invention.

Example B was prepared following the protocol set forth above for Example A, except that for Example B, instead of using the N5-2B foil, the Rene N5 subcomponents were aligned in a fixture with a ~2 mil thick MDC115 foil (see Table I) comprising 3 wt % boron, obtained from Materials Development Corporation, as filler material. FIG. 3 is a photo micrograph showing the microstructure change at the joint following the first and second heat treatments.

Analysis of Inventive Example A

Figure 4:
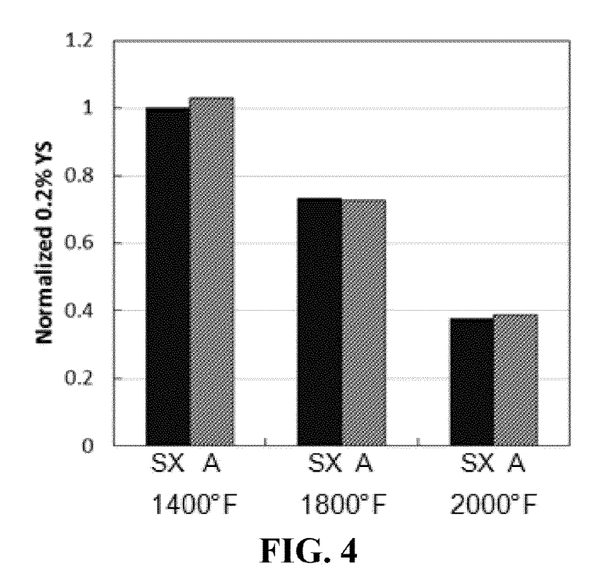
FIG. 4 depicts a chart showing the results of yield strength testing on bonded superalloy components according to embodiments of the present invention as compared to a non-bonded single crystal superalloy component without a joint. The yield strength values were normalized against the yield strength of a non-bonded single-crystal superalloy at 1400° F.
Figure 5:
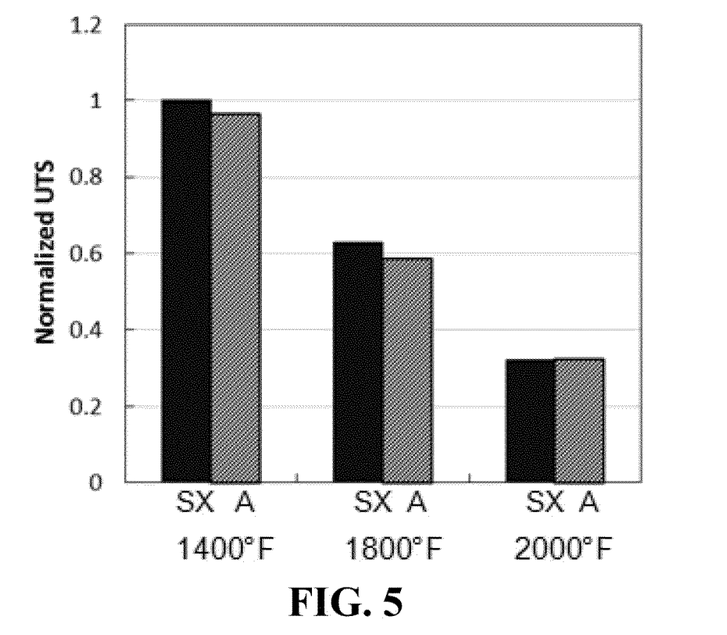
FIG. 5 depicts a chart showing the results of ultimate tensile strength testing on bonded superalloy components according to embodiments of the present invention as compared to a non-bonded single crystal superalloy component without a joint. The ultimate tensile strength values were normalized against the ultimate tensile strength of a non-bonded single-crystal superalloy at 1400° F.
Figure 6:
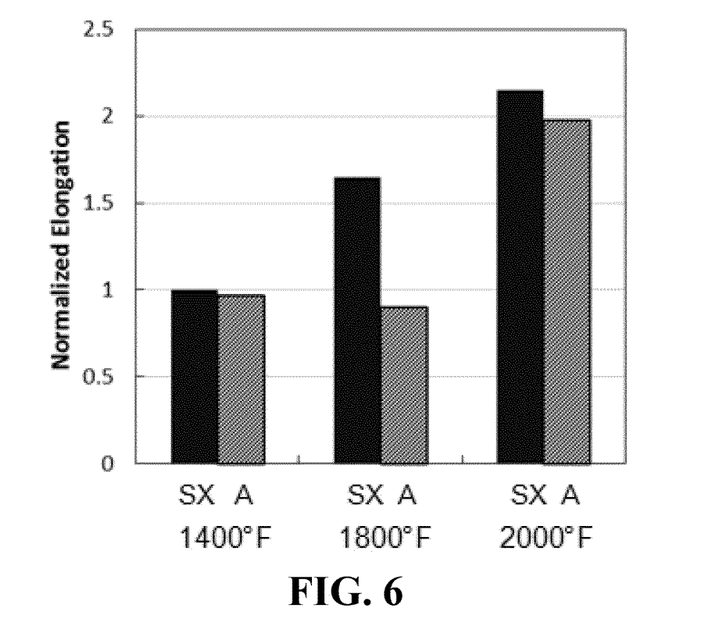
FIG. 6 depicts a chart showing the results of elongation testing on bonded superalloy components according to embodiments of the present invention as compared to a non-bonded single crystal superalloy component without a joint. The elongation values were normalized against the elongation of a non-bonded single-crystal superalloy at 1400° F.

High temperature tensile and creep properties of the single-crystal Rene N5 subcomponents joined with the N5-2B foil comprising 2 wt % boron (Example A) were measured and compared with a single crystal Rene N5 superalloy without a joint (Counter Example SX). The joined N5 was solution treated at 1300° C. for 2 h, followed by aging treatments at 1120° C./4 h, 1080° C./4 h and 900° C./4 h. FIG. 4 depicts a chart showing the results of the normalized yield strength testing. FIG. 5 depicts a chart showing the results of normalized ultimate tensile strength testing. FIG. 6 depicts a chart showing the results of normalized elongation testing. As shown in FIGS. 4-6, yield strength, ultimate tensile strength and elongation of the N5 joined with the N5-2B foil comprising 2 wt % boron (Example A) were all comparable to, and did not show any significant debit in properties up to 2000° F.

compared with the single crystal Rene N5 without joint (SX), except for elongation testing at 1800° F., which was due to this Example A having large pores along the joint, which caused the relatively low elongation compared with the SX baseline.

Figure 7:
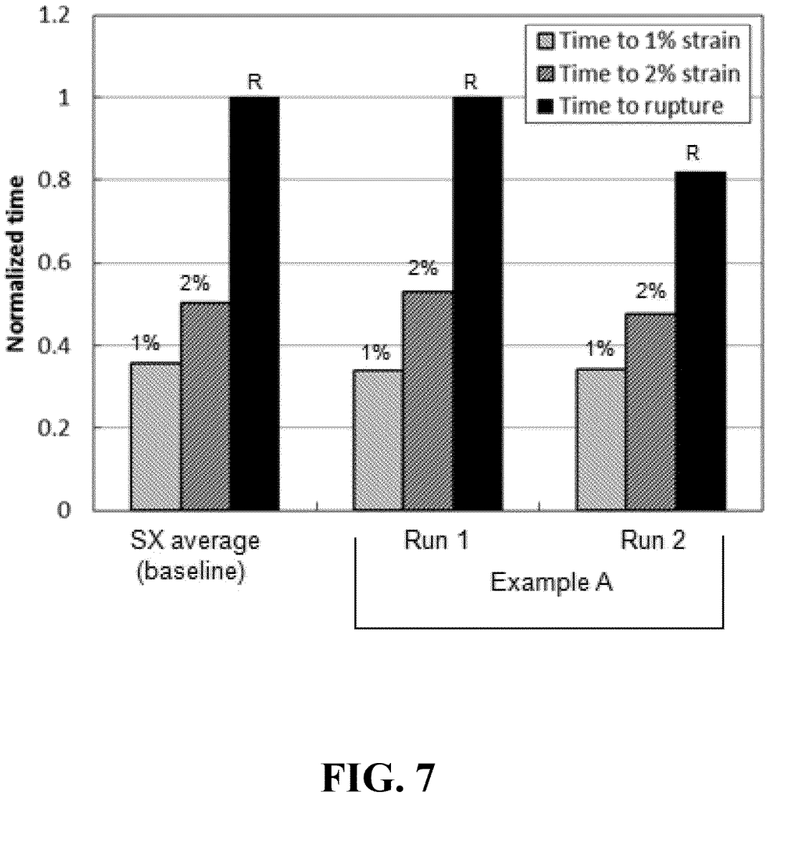
FIG. 7 is a chart depicting 1800° F./30 ksi creep test results for testing done on bonded superalloy components according to embodiments of the present invention as compared to a non-bonded single crystal superalloy component without a joint. Time was normalized against the rupture life of a non-bonded single-crystal superalloy.

FIG. 7 is a chart depicting 1800° F./30 ksi creep test results for testing done on SX and Example A. As illustrated by the figure, the normalized time to 1% and 2% strain for the joined components of Example A made according to the inventive method are comparable to those of baseline data, i.e., for a single crystal Rene N5 superalloy without joint (SX).

The foregoing results indicate that the joints produced by the inventive process are mechanically sound.

Comparative Example C

A comparative example according to prior art transient liquid phase bonding processes (TLPB) was also carried out. Two Rene N5 nickel-based single crystal superalloy subcomponents were prepared by finishing with low stress grinding, such that the subcomponents had less than 10° crystal orientation deviation from each other, had substantially flat mating surfaces, and were smooth and clean. The Rene N5 subcomponents were aligned in a fixture with a ~2 mil thick filler material of MDC115 foil comprising 3 wt % boron, obtained from Materials Development Corporation, with applied pressure of about 1 MPa. In a vacuum environment, the aligned subcomponents were subject to a TLPB heat treatment while in the fixture at 1280° C. for four hours, then the subcomponents were allowed to cool to room temperature.

Figure 8:
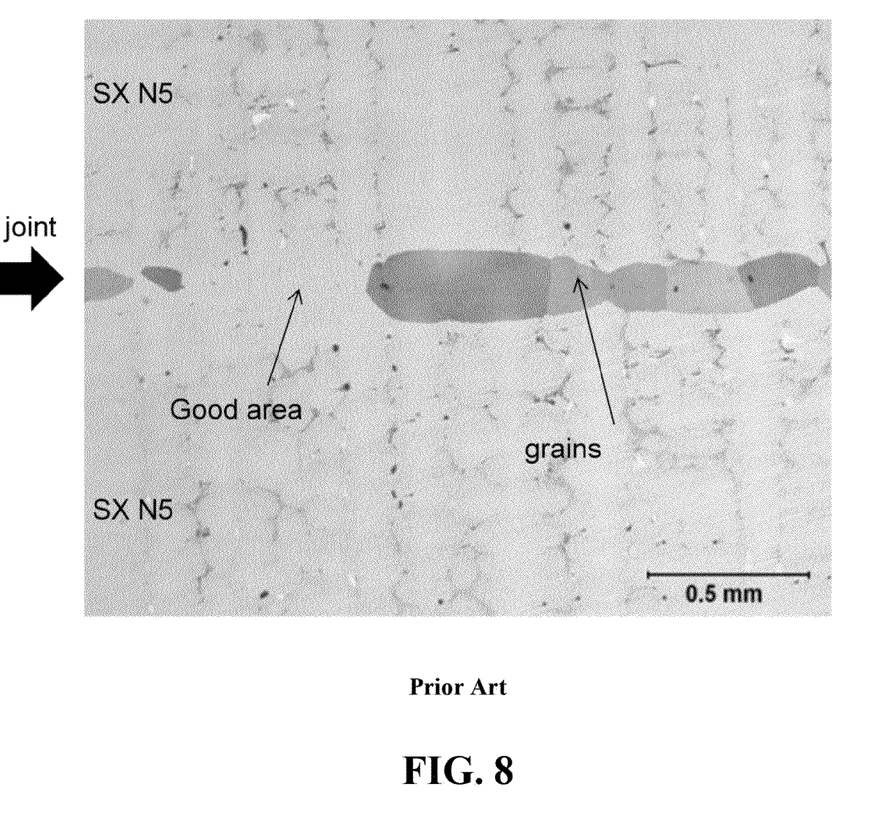
FIG. 8 is a photo micrograph showing the microstructure change at the joint for a bonded superalloy component made using a prior art transient liquid phase bonding heat treatment.

FIG. 8 is a photo micrograph showing the microstructure change at the joint for Comparative Example C following the TLPB heat treatment. Consistent with prior art TLPB attempts, it proved difficult to create a satisfactory joint using the prior art TLPB process. As can be seen in FIG. 8, the resultant joint included a mixture of areas without grains and with grains (compare to FIGS. 1 and 3, showing superior joint areas obtained with the inventive bonding method). Due to the large size of the grains present at the joint, it is not possible to eliminate the grains using grain coarsening. The TLPB bonding process of the comparative example is inferior to the inventive process that can consistently produce sound joint without grains.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, if present, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of bonding superalloys comprising:
aligning a first superalloy subcomponent having a gamma-prime solvus $g'_1$ and a second superalloy subcomponent having a gamma-prime solvus $g'_2$, with a filler material comprising at least 1.5 wt % boron disposed therebetween;
performing a first heat treatment at a temperature $T_1$, wherein $T_1$ is above the solidus of the filler material and below the liquidus of the filler material; and
performing a second heat treatment at a temperature $T_2$, wherein $T_2$ is greater than $T_1$, and wherein $T_2$ is greater than or equal to the lower of $g'_1$ and $g'_2$; thereby bonding the first superalloy subcomponent and the second superalloy subcomponent.

2. The method according to claim 1, wherein the first superalloy subcomponent is the same material as the second superalloy subcomponent.

3. The method according to claim 1, wherein the first superalloy subcomponent is a different material than the second superalloy subcomponent.

4. The method according to claim 1, wherein the first superalloy subcomponent and the second superalloy subcomponent are single-crystal materials and have less than a 10° crystal orientation deviation from each other.

5. The method according to claim 1, wherein:
(a) the first superalloy subcomponent comprises a single crystal superalloy and the second superalloy subcomponent comprises a directionally solidified superalloy;
(b) the first superalloy subcomponent comprises a directionally solidified superalloy and the second superalloy subcomponent comprises a directionally solidified superalloy;
(c) the first superalloy subcomponent comprises a single crystal superalloy and the second superalloy subcomponent comprises a polycrystalline superalloy;
(d) the first superalloy subcomponent comprises a directionally solidified superalloy and the second superalloy subcomponent comprises a polycrystalline superalloy; or
(e) the first superalloy subcomponent comprises a polycrystalline superalloy and the second superalloy subcomponent comprises a polycrystalline superalloy.

6. The method according to claim 1, wherein at least one of the first superalloy subcomponent and the second superalloy subcomponent is a single crystal superalloy subcomponent.

7. The method according to claim 1, wherein both the first superalloy subcomponent and the second superalloy subcomponent are single crystal superalloy subcomponents.

8. The method according to claim 7, wherein the first superalloy subcomponent and the second superalloy subcomponent comprise a single crystal cast nickel-based superalloy.

9. The method according to claim 8, wherein the first superalloy subcomponent and the second superalloy subcomponent comprise at least 50 wt % nickel.

10. The method according to claim 1, wherein the first superalloy subcomponent and the second superalloy subcomponent comprise nickel, cobalt, chromium, molybdenum, tungsten, aluminum, and tantalum.

11. The method according to claim 1, wherein the filler material is a foil.

12. The method according to claim 1, wherein the filler material is a coating deposited on at least one of the first superalloy subcomponent and the second superalloy subcomponent.

13. The method according to claim 1, wherein the filler material comprises 1.5 to 4 wt % boron.

14. The method according to claim 1, wherein the filler material has a thickness of 10 to 50 μm.

15. The method according to claim 1, wherein the first heat treatment is performed at a temperature $T_1$ at least 20° C. above the solidus of the filler material.

16. The method according to claim 1, wherein the first heat treatment is performed at a temperature $T_1$ of 1,100 to 1,200° C.

17. The method according to claim 1, wherein the second heat treatment is performed at a temperature $T_2$ greater than or equal to the higher of $g'_1$ and $g'_2$.

18. The method according to claim 1, wherein the second heat treatment is performed at a temperature $T_2$ of 1,225 to 1,325° C.

19. The method according to claim 1, wherein, during the first heat treatment, the temperature is held at $T_1$ for at least one hour, and wherein, during the second heat treatment, the temperature is held at $T_2$ for at least one hour.

20. The method according to claim 1, wherein, during the first heat treatment, 0.5 to 2 MPa pressure is applied to the first and second superalloy subcomponents.

* * * * *